United States Patent [19]

Goldberg et al.

[11] 3,927,930

[45] Dec. 23, 1975

[54] LIGHT POLARIZATION EMPLOYING MAGNETICALLY ORIENTED FERRITE SUSPENSIONS

[75] Inventors: Paul Goldberg, West Newton; Pieter J. van Heerden, Concord, both of Mass.

[73] Assignee: Polaroid Corporation, Cambridge, Mass.

[22] Filed: May 13, 1974

[21] Appl. No.: 469,373

Related U.S. Application Data

[63] Continuation-in-part of Ser. No. 270,526, July 10, 1972, abandoned, which is a continuation-in-part of Ser. No. 86,997, Nov. 4, 1970, abandoned.

[52] U.S. Cl. .............. 350/151; 250/225; 356/115; 427/47; 427/128; 428/900
[51] Int. Cl.² ........................................... G02F 1/09
[58] Field of Search ........................ 117/234–240; 252/62.54, 62.52, 62.51; 350/151; 356/115; 250/225; 427/47, 127–132

[56] References Cited
UNITED STATES PATENTS

| | | | |
|---|---|---|---|
| 2,964,793 | 12/1960 | Blume | 18/47.5 |
| 2,971,916 | 2/1961 | Schleicher et al. | 117/238 X |
| 3,066,355 | 12/1962 | Schloemann et al. | 252/62.54 X |
| 3,067,140 | 12/1962 | Davis | 252/62.54 X |
| 3,189,550 | 6/1965 | Malinofsky | 252/62.5 |
| 3,221,315 | 11/1965 | Brown et al. | 117/235 X |
| 3,320,523 | 5/1967 | Trimble | 350/151 UX |
| 3,421,002 | 1/1969 | Berger | 117/238 X |
| 3,683,382 | 8/1972 | Ballinger | 117/238 X |

OTHER PUBLICATIONS

Magnetic Fluids, Rosensweig, pp. 48–54 and 56, International Science & Tech., 7–66.

*Primary Examiner*—Bernard D. Pianalto
*Attorney, Agent, or Firm*—Mart C. Matthews; Philip G. Kiely

[57] ABSTRACT

Light polarization is provided by disposing finely divided ferrite particles in an inert light-transmitting medium on a transparent support to form a suspension of the particles in the medium, applying a magnetic field to the suspension to orient the particles into line patterns which polarize visible light transmitted through the suspension and detecting the polarized light by suitable means.

9 Claims, No Drawings

LIGHT POLARIZATION EMPLOYING MAGNETICALLY ORIENTED FERRITE SUSPENSIONS

CROSS REFERENCE TO RELATED APPLICATIONS

This application is a continuation-in-part of copending application Ser. No. 270,526 filed July 10, 1972 now abandoned which in turn was a continuation-in-part of application Ser. No. 86,997 filed Nov. 4, 1970 and now abandoned.

BACKGROUND OF THE INVENTION

1. Field of the Invention

This invention relates to the polarization of light and, in particular, to polarizing light by employing a suspension of ferrite particles under the influence of a magnetic field in a light-transmitting inert medium.

2. Description of the Prior Art

It is known that light polarizing devices can be prepared by dispersing asymmetric bodies, i.e., crystals wherein one axis is relatively long compared to another, in a fluid medium and then subjecting them to an electric or magnetic field. After the axes have been aligned in the field, it is possible to transmit one component of incident radiation through the medium between the crystals in the direction of the long axis while the suspended bodies absorb a second component to thus polarize the radiation. Usually, such suspended particles are dichroic (i.e., are light polarizers in their own right) and transparent in the fluid medium. In these cases, the transmitted polarized light has an intensity relative to the incident light which depends on the strength of the field. For an example of light polarizing devices of the above-described type, see Land U.S. Pat. No. 1,955,923.

Stable suspensions of very fine particles of solid ferromagnetic material, e.g., ferrites, in inert liquids are known and commercially available. These suspensions, known as "ferrofluids," have been subjected to magnetic fields in the past and a wide variety of interesting physical phenomena observed. In contrast to the suspended crystals of the aforementioned patent, these ferrite particles may be considered substantially spherical (i.e., symmetrical) in shape and optically neutral. See, for example, the article entitled "Magnetic Fluids" by R. E. Rosensweig, *International Science and Technology*, 56 (July 1966), pages 48–54. Prior to the present invention, the ability of these ferrofluids under the influence of a magnetic field to polarize light has not been known or appreciated by the art. It is to this discovery which the present invention is directed.

SUMMARY OF THE INVENTION

In accordance with this invention, finely divided ferrite particles, e.g., having a particle size of about 0.02 micron in diameter, are suspended in a light-transmitting inert medium, preferably water, on a transparent support. A magnetic field is applied to the ferrite suspension whereupon the ferrite particles orient themselves in the medium to form elongated, line-shaped agglomerates which polarize visible light passing through the magnetized suspension. The polarization of the transmitted light is readily detected by suitable detection means, e.g., by employing a polarimeter or "crossed" polarizers.

DETAILED DESCRIPTION OF THE PREFERRED EMBODIMENT

Ferrites are compounds of iron, e.g., $NaFeO_2$, which are known and have been of significant recent interest in the electronics art because of their insulating properties. As previously indicated, suspensions of finely divided ferrites in inert (i.e., non-optically active) liquids such as water, kerosene or silicone oil are commercially available and readily obtained. Typically, a surfactant is also included in the suspension to prevent clumping of particles and to permit disposition of more uniformly distributed particles in the suspending medium.

In the practice of this invention, such a ferrite suspension may be placed on a suitable transparent support, for example, glass or a polymeric material such as polymethyl methacrylate, exposed to a source of visible light and subjected to a magnetic field, for example, by disposing the supported suspension between the poles of a magnet. Since polarized light is not apparent to the unaided eye, the polarization of the light which is transmitted through the suspension while under the influence of the magnetic field may be observed by employing conventional light polarization detection means such as a polarimeter, polariscope, crossed polarizers, etc. The polarization of the present invention is such that the electrical vector of the light wave parallel to the lines of force of the magnetic field is absorbed (this vector is that which is reflected from a water surface at an angle of about 50°) while the perpendicular vector is transmitted.

The number of ferrite particles per unit area, i.e., the thickness of a layer comprising the ferrite suspension, is not critical. Polarization in accordance with this invention may be achieved substantially as efficiently through a relatively thin layer of the suspension as through a relatively thick layer. Typically, suspensions having a concentration of ferrites from about 0.02 g per cc to about 0.50g per cc may be employed in the present invention.

In contrast with the prior art polarizing suspensions previously mentioned, the strength of the magnetic field is not critical to the light polarization of this invention. It is only necessary that sufficient magnetic force be applied to orient the particles into the above-described line-shaped patterns (i.e., the saturation magnetization). Increasing the force of the magnetic field in excess of the saturation magnetization of the particles does not change the efficiency of the polarizer. Polarization does diminish gradually, however, as the distance at which the suspension is placed from the magnetic field increases. The time required for the ferrite suspension to acquire its polarizing properties under the influence of the magnetic field is essentially equal to the rise time of the magnetic field. Thus, the time of formation of the polarizer of this invention is measured in microseconds, e.g., less than about 100 microseconds.

It is to be understood that the magnetic force applied in the practice of the invention need not be stationary. For example, a rotating polarizer could be formed by arranging for the rotation of the magnetic field.

A variety of suspending media may be employed, provided the media are not optically active. As examples of suitable suspending media, mention may be made of water, kerosene, silcones, and polymerizable monomers. It is possible to obtain a polarizer which retains its polarizing properties when removed from the magnetic field by selecting the appropriate medium and, while under the influence of the magnetic field, setting the medium to a solid or rigid form. For example, the medium may comprise a polymerizable monomer which may be polymerized while in the magnetic field to freeze the ferrites in the oriented attitude in the solid polymeric medium.

A particularly preferred suspending medium is water since stronger polarization of light is achieved with water than with other media. When water is employed, there is also exhibited a wavelength independent scattering of light which under favorable conditions of illumination, shows up as a brilliant red color when observed at certain angles. A permanent polarizer may be prepared when water is the suspending medium simply by freezing the suspension. It is interesting to note that this freezing results in a large decrease in the degree of polarization over that shown by water, and approaches that shown by other liquid media such as kerosene and silicone oil.

To investigate the physical changes in the ferrite suspension when subjected to a magnetic field to form a light polarizer in accordance with this invention, a wax imprint was made of the surface of a layer comprising a water base suspension of ferrite particles, about 0.02 micron in diameter and at a concentration of about 0.1 g per cc, frozen while under the influence of a magnetic field of about 2000 gauss. A carbon replica was made of the wax imprint and the pattern of the particles recorded employing an electron microscope at 100,000 × magnification. The photomicrographs thus obtained showed regular line-shaped agglomerates of ferrite particles about 0.4 micron apart. In addition, similar layers were also dried while in the magnetic field and inspected in an optical microscope with a 100 × oil immersion objective. Fine regular line patterns could be observed with a minimum line distance of about 0.8 micron.

From the foregoing observations, it may be concluded that the magnetic field causes the ferrite particles to assemble in line patterns in the liquid medium, very similar to the behavior of iron filings on a glass plate, and that the very small distance between these line patterns results in high absorption of the electric vector which is parallel to the lines. Furthermore, it is believed that each individual line acts as a separate polarizing absorber since the polarizers of the present invention, being colorless with respect to transmitted light, act independently of wavelength in the visible region of the spectrum. In contrast, the polarizing action of known optical conducting gratings falls off steeply at the wavelength which is equal to the distance between the lines in the grating.

In Tables 1 and 2 below are recorded respective quantitative data of the degree of polarization of transmitted light from water base and kerosene base polarizers of the present invention. For each polarizer, several density readings were taken at different locations on the polarizer. The $D_{max} = \log_{10} (I_0/I_1)$ where $I_0$ is the intensity of polarized light illuminating the polarizer and $I_1$ is the intensity of the transmitted light at maximum density. $D_{min} = \log_{10} (I_0/I_2)$ where $I_2$ is the transmitted light at minimum density. The dichroic ratio $(D_{max}/D_{min})$ is a good measure of the degree of polarization since if the light is polarized by a number of individual elements or particles, D is independent of the density, i.e., independent of the number of elements per square centimeter.

TABLE 1

Water Base Ferrite Suspension
Saturation magnetization 100 gauss

| Concentration 0.1 g./cc. | | Particle size 0.02 micron |
|---|---|---|
| $D_{max}$ | $D_{min}$ | D |
| 0.71 | 0.50 | 1.42 |
| 0.87 | 0.60 | 1.44 |
| 0.98 | 0.67 | 1.46 |
| 2.22 | 1.53 | 1.45 |
| Concentration 0.1 g./cc. | | Particle size 0.02 micron |
| 0.55 | 0.39 | 1.40 |
| 0.62 | 0.42 | 1.48 |
| 1.04 | 0.72 | 1.45 |
| Concentration 0.05 g./cc. | | Particle size 0.02 micron |
| 0.58 | 0.39 | 1.50 |
| 0.61 | 0.41 | 1.50 |
| 0.74 | 0.49 | 1.53 |
| Concentration 0.1 g./cc. | | Particle size 0.02 micron |
| 0.22 | 0.16 | 1.38 |
| 0.38 | 0.26 | 1.38 |
| 0.41 | 0.31 | 1.33 |
| Concentration 0.1 g./cc. | | Particle size 0.02 micron |
| 0.31 | 0.23 | 1.36 |
| 0.38 | 0.30 | 1.33 |
| 0.40 | 0.29 | 1.40 |
| Saturation magnetization 600 gauss | | |
| Concentration 0.6 g./cc. | | Particle size 0.02 micron |
| 2.01 | 1.51 | 1.33 |
| 2.14 | 1.67 | 1.28 |
| 2.57 | 1.95 | 1.31 |
| 3.10 | 2.56 | 1.21 |

TABLE 2

Kerosene Base Ferrite Suspension
Saturation magnetization 100 gauss

| Concentration 0.1 g./cc. | | Particle size 0.02 micron |
|---|---|---|
| $D_{max}$ | $D_{min}$ | D |
| 0.68 | 0.64 | 1.07 |
| 0.76 | 0.72 | 1.06 |
| 0.83 | 0.78 | 1.06 |
| 0.97 | 0.92 | 1.05 |

A comparison of the data set forth in Tables 1 and 2 supports the contention that the polarization provided by the present invention is substantially independent of the thickness of the layer, that is, the number of ferrite particles per centimeter square, and that as indicated above, water as the suspending medium provides a polarizer with a much higher degree of polarization than other suspending media.

Since certain changes may be made in the above produce and process without departing from the scope of the invention herein involved, it is intended that all matter contained in the above description be interpreted as illustrative and not in a limiting sense.

What is claimed is:

1. Light polarization apparatus comprising:
   a source of visible light;
   a light polarizer exposed to said visible light and comprising finely divided ferrite particles suspended in an inert light-transmitting medium on a transparent support, said ferrite particles being magnetically oriented in said medium into line-shaped patterns which polarize said visible light transmitted through said suspension; and
   means for detecting said transmitted polarized light.

2. Apparatus as defined in claim 1 wherein said medium is liquid.

3. Apparatus as defined in claim 1 wherein said medium is water.

4. Apparatus as defined in claim 1 wherein the particle size of said ferrite particles is about 0.02 micron in diameter.

5. Apparatus as defined in claim 1 wherein the concentration of said ferrite particles in said suspension is about 0.02 to 0.50 gram per cc.

6. A method of light polarization which comprises:
exposing to a source of visible light, a suspension of finely divided ferrite particles in an inert liquid medium on a transparent support;
subjecting said suspension to a magnetic field to orient said particles in said medium into line-shaped patterns which polarize said visible light transmitted through said suspension to form a light polarizer; and
detecting said transmitted polarized light by observing said light through conventional polarized light detection means.

7. A method as defined in claim 6 wherein said liquid medium is water.

8. A method as defined in claim 6 wherein said liquid medium is set to a rigid form while under the influence of said magnetic field to form thereby a polarizer which retains its light polarizing properties when removed from said magnetic field.

9. A method as defined in claim 8 wherein said settable medium is a polymerizable monomer.

* * * * *